United States Patent [19]
van den Berg et al.

[11] Patent Number: 5,873,323
[45] Date of Patent: Feb. 23, 1999

[54] METHOD OF MILKING ANIMALS AUTOMATICALLY WHILE DETERMINING THEIR PHYSIOLOGICAL CONDITION

[75] Inventors: Karel van den Berg, Bleskensgraaf; Rene Fransen, Vlaardingen, both of Netherlands

[73] Assignee: C. van der Lely, N.V., Maasland, Netherlands

[21] Appl. No.: 620,164

[22] Filed: Mar. 22, 1996

Related U.S. Application Data

[60] Division of Ser. No. 66,056, May 27, 1993, Pat. No. 5,568,788, which is a continuation-in-part of Ser. No. 916,728, Jul. 22, 1992, Pat. No. 5,275,124, which is a continuation of Ser. No. 818,764, Jan. 13, 1992, Pat. No. 5,195,456, which is a continuation-in-part of Ser. No. 485,579, Feb. 27, 1990, Pat. No. 5,080,040.

[30] Foreign Application Priority Data

Sep. 25, 1991 [NL] Netherlands .......................... 9101636
Sep. 24, 1992 [NL] Netherlands ................... WO93/05647

[51] Int. Cl.⁶ .................... A01J 5/013; A01J 5/01
[52] U.S. Cl. .................... 119/14.02; 119/14.08; 119/14.15
[58] Field of Search ............. 119/14.02, 14.03, 119/14.08, 14.15, 14.17

[56] References Cited

U.S. PATENT DOCUMENTS

| | | | |
|---|---|---|---|
| 3,556,053 | 1/1971 | Padman et al. ....................... | 119/14.08 |
| 3,695,230 | 10/1972 | Quayle et al. .................... | 119/14.15 X |
| 5,054,425 | 10/1991 | Grimm et al. ........................ | 119/14.02 |
| 5,080,040 | 1/1992 | van der Lely et al. .......... | 119/14.17 X |

FOREIGN PATENT DOCUMENTS 91892  10/1983  European Pat. Off. ............ 119/14.02

Primary Examiner—Robert P. Swiatek
Attorney, Agent, or Firm—Penrose Lucas Albright

[57] ABSTRACT

A method for milking animals, such as cows, wherein the cows enter a milking compartment where teat cups of a milking apparatus are automatically attached to their teats. In the milk conduit system leading from the teat cups, sensors are placed to measure a variety of parameters and provide data to a computer for processing and presenting the data which the computer receives from the sensors. This data includes information from a flow sensitive sensor, a temperature sensitive sensor, and a sensor sensitive to electric conductivity of the milk. Information is also provided from the milking compartment to the computer on how much food is consumed by each animal, and how many times each animal enters the milking compartment. The computer compares the data received from the various sensors with similar data from immediately preceding selected periods of time, whereby a progressive average of the relevant data is available and compared for each animal. The data received for ill or animals in estrus differ from those of healthy and non-estrus animals, whereby the sensors are detecting and the computer is processing and determining from the data provided from the sensors on a continuing basis which animals are and are not healthy or in estrus.

38 Claims, 1 Drawing Sheet

METHOD OF MILKING ANIMALS AUTOMATICALLY WHILE DETERMINING THEIR PHYSIOLOGICAL CONDITION

RELATED APPLICATIONS

This Patent Application is a divisional of application Ser. No. 08/066,056, filed May 27, 1993 and issued as U.S. Pat. No. 5,568,788, which is a continuation-in-part of application Ser. No. 916,728, filed Jul. 22, 1992 and issued as U.S. Pat. No. 5,275,124 on Jan. 4, 1994, which is a continuation of application Ser. No. 818,764, filed Jan. 13, 1992 and issued as U.S. Pat. No. 5,195,456 on Mar. 23, 1993, which is a continuation-in-part of application Ser. No. 485,579, filed Feb. 27, 1990 and issued as U.S. Pat. No. 5,080,040 on Jan. 14, 1992. U.S. Pat. No. 5,568,788 is a section 371 filing of PCT/NL92/00162 (W093/05647).

FIELD OF THE INVENTION

The present invention relates to an apparatus and a method for automatically milking animals, such as cows. More particularly, it relates to a method of determining which animals in a herd of animals being milked are ill or estrous.

BACKGROUND OF THE INVENTION

Automatic milking takes place in a milking parlor which is provided with a milking robot typically comprising a robot arm functioning as a carrier of one or several teat cups to be applied to the teats of an animal's udder. The teats are located by means of one or several sensors, whereupon the robot arm—swung from a side of the milking parlor to underneath the animal—can be positioned so that through an upward movement of an appropriate teat cup that teat cup is applied to a teat of the animal's udder.

SUMMARY OF THE INVENTION

In order to control the process of connecting the teat cups, the milking process itself, and to do so with knowledge of the physical constitution of the cows, according to the invention, the apparatus is characterized by the provision of one or more sensors in the line system from a teat cup down to the location where the milk lines from the teat cups join, including a vacuum-sensitive sensor, a flow-sensitive sensor, a temperature sensitive sensor, an electrical conductivity sensor, or a combination thereof. A computer is utilized for processing and reproducing the information provided by these sensors. Such a line system may be provided for each of the quarters of the animal's udder. The sensors may be placed in only one line and consequently relate to the flow of milk from only one teat, but they may also be placed in several lines from individual teat cups and thus relate to the flow of milk from several teats. When the flows of milk from the individual teats are combined in a milk claw, the sensors should be placed in one or several teat cups and in the relatively short lines from said teat cups to the milk claw; if desired, the milk claw may comprise separate compartments to accommodate sensors for each of the quarters of the animal's udder, with the milk from these compartments joining together in a further part of this milk claw. When the milk from the individual teats is fed through separate lines to a common milk meter, the sensors in one or several teat cups and in these separate milk lines should be positioned before the connection to the milk meter. When separate milk meters are used for the milk flows from the various teats, the flow of milk leaving such a milk meter is fed into a central milk line and the line system in which sensors may be installed is considerably longer. It should be kept in mind, however, that the location of the sensors is also determined to a large extent by the nature of the sensor. The temperature-sensitive sensor, for example, should not be too far downstream from a teat cup, because otherwise the milk will have cooled too much and the information from this sensor will thus be of little value.

According to another aspect of the invention, the apparatus can be provided with a vacuum-sensitive sensor for each of a plurality of teat cups, to detect the presence and/or amount of vacuum drawn therein. For a set of teat cups, the apparatus may be provided with a vacuum-sensitive and a flow-sensitive sensor combined with a computer to determine the dead time associated with the flow of milk for the set of teat cups, as such. However, for each of a plurality of teat cups, the apparatus may also comprise a combination of a vacuum-sensitive and a flow-sensitive sensor to determine, in association with a computer, the dead time with regard to the flows of milk in each of the relevant teat cups.

According to a further aspect of the invention, the apparatus can include a temperature-sensitive sensor for one or several teat cups to determine the temperature of the relevant flow of milk that works in conjunction with a computer which records and compares the dead times, whereupon data of an abnormally high temperature coupled with data of a comparatively long dead time are indicative of a physiological condition in the animal. Furthermore, there may be provided for one teat cup or for each of a plurality of teat cups a combination of a temperature-sensitive sensor and a sensor to determine the electrical conductivity of a flow of milk, by means of which combination, in association with a computer, mastitis may be detected in one or several quarters of the animal's udder.

A problem exists wherein an attempt to apply the teat cup correctly to an appropriate teat is unsuccessful.

As hereinafter described, this invention provides a capability to detect and resolve this problem. As soon as a teat cup has been applied to an appropriate teat of the animal's udder, a vacuum is drawn in the teat cup, the presence of which vacuum is detected by a vacuum-sensitive sensor. However, if the vacuum-sensitive sensor does not detect the presence of a vacuum, which indicates that the teat cup has not been applied or has not been properly applied, one or more subsequent attempts may be made to apply the teat cup to the relevant teat, possibly preceded by a renewed determination of the teat's position in respect of the teat cup which is carried by the robot arm and is to be applied to this teat. Indication of the presence or absence of a sufficient vacuum may be a signal produced by the vacuum-sensitive sensor to a computer which controls the robot arm.

However, even if a sufficient vacuum has been detected by the vacuum-sensitive sensor, it may happen that the teat cup is not correctly connected. The possibility exists that the teat cup is connected to a folded-up teat pressed against the udder, so that the teat is improperly seated in the teat cup, whereas a sufficient vacuum may nevertheless be drawn in the teat cup. This situation may also be detected according to this invention as follows: After a teat cup has been applied to the appropriate teat, the start of the milk flow is detected by means of a flow-sensitive sensor, whereas, if, within a predetermined time from the connection of the relevant teat, the milk flow from this teat has not started, the teat cup is disconnected and applied anew. In disconnecting and re-applying the teat cup, the teats should be distinguished from each other. When the teat cups are installed from one side with respect to the animal's udder, the teat cups may be positioned underneath the teats concerned and then applied to them, but when one of the teat cups is to be disconnected and then re-applied to a hindmost teat this teat cup may be impeded by the foremost teat cup that is already connected. If this situation occurs, then first the two foremost teat cups are disconnected, next the hindmost teat cup is connected and thereafter, the two foremost teat cups are re-applied. In other words, if a hindmost teat cup needs to be disconnected to be re-applied, the foremost teat cups are first disconnected, primarily because of a lack of space; whereas if a foremost teat cup needs to be disconnected and re-applied, this can be accomplished immediately. However, when the distance between the foremost teats is sufficiently large, whereby re-applying a hindmost teat cup is not impeded, it will not be necessary to remove the foremost teat cups first. When the position of a teat has been determined, a teat cup is connected to this teat through means provided for this purpose, these means being part of the milking robot.

According to the invention these means, e.g. an electro-magnet gripping the teat cups individually and being moved upwards hydraulically as described in European Patent Application EP-A-0 360 354 of Mar. 28, 1990, of van der Lely et al, remain activated until the presence of a sufficient vacuum in the teat cup has been established by the vacuum-sensitive sensor, whereas in the event there is not enough vacuum after a certain time lapse of, for example, a few seconds, there will be a further attempt to connect the relevant teat cup by renewed activation of said means. After a proper connection of a teat cup to an appropriate teat has been made, the vacuum can be continuously monitored to obtain an indication signal if the teat cup is disengaged from the teat before the flow of milk has stopped. e.g. owing to the fact that it is kicked off by the animal.

The time lapse from the instant a teat cup is connected to a teat to the instant the flow of milk from this teat starts is called the dead time. This dead time can be measured and recorded in a computer. Accordingly, the invention also relates to a method of milking animals, especially cows, automatically, where the dead time between the instant one of the teat cups is connected to an appropriate teat and the instant the flow of milk from this teat starts is measured and recorded by a computer. In particular, the dead time between the instant the vacuum-sensitive sensor has established that a sufficient vacuum exists in a teat cup applied to a relevant teat and the instant a flow-sensitive sensor has detected that the milk has begun to flow is sensed and transmitted to a computer. It is generally sufficient to determine the dead time with respect to the start of the milk flow in the teat cup last applied. The idea behind this is that the dead time with respect to the last teat cup will be much the same as the dead times of the other teat cups. It would be more accurate and methodical, however, to measure and record the dead times for the flows of milk from each of the teats.

In actual practice situations occur associated with the physical condition of the animals, which cause relatively large differences in dead times with regard to when milk flows commence from the various teats. Of course, situations such as where the last teat cup has not been applied correctly, or not at all, with the result that the animal cannot be milked at all, while the flows of milk in the teat cups connected first have already started, may occur at any time. Nevertheless, if the animal should not be milked, the animal should then be induced to leave the milking parlor. Insofar as dead times which have been established relative to the flows of milk which did start, further conclusions may, of course, be drawn therefrom.

According to another aspect of the invention, the extent to which the dead time has exceeded a predetermined historical value for a particular animal can be determined by means of the computer. In particular, for each of the flows of milk from the various teats, the extent to which dead time exceeds that predetermined value is determined. This predetermined value will be different not only for various animals, but it will also change as the animals age. The farmer, however, will be basically interested only in those cases where pre-determined values are exceeded. When an animal is estrous or ill, its dead time will generally be longer than usual. If the predetermined value of the dead time has been exceeded by a certain percentage, the farmer is accordingly provided an indication signal that the animal is in heat or is ill.

If a relatively long time, for example, twice the dead time determined previously for the animal, has elapsed after the vacuum in the teat cup has been established, then the computer draws the conclusion that the dead time cannot be determined, because the flow of milk has apparently not started, which may happen when an animal recently milked has entered the milking parlor to be milked again. The animal should then be led away from the milking parlor.

According to the invention, reliable indications of heat or illness are obtainable from parameters including one or more of the following: the milk rate of flow, the temperature of a milk flow, the milk yield, the number of times per a given time period that an animal enters or attempts to enter the milking parlor, or the quantity of food it consumes in the milking parlor. These parameters for ill or estrous animals are different from those for healthy and non-estrous animals. One or more of these parameters may be combined with dead time data and analyzed by a computer. A particularly advantageous combination includes measurements of the temperatures of each of the flows of milk from the various teats. To ascertain these temperatures, use is made of temperature-sensitive sensors arranged in the milk flows from the animal's teats. When the farmer receives an indication that an animal is ill or is in the process of becoming ill, it is important to know whether mastitis or any other disease is involved. According to the invention, an indication that an animal suffers from mastitis can be communicated to the computer by means of a sensor of the electrical conductivity of the milk flow and, if necessary, also by means of a temperature-sensitive sensor. In particular, the electrical conductivity of the milk flow from each of the teats can be ascertained. Furthermore, the computer can also determine to what extent the electrical conductivity of a flow of milk exceeds a predetermined value for a particular animal. To exclude short-lived fluctuations as well as to adjust for gradual changes in electrical conductivity of the milk flows, this predetermined value is repeatedly redefined by the progressive average of the relevant values established in the immediately preceding period of time, for instance, the average of the latest ten measurements of electrical conductivity. As a practical matter, this methodology can also be used for arriving at the predetermined threshold values of the dead time.

Not only can the flow-sensitive sensor be used for establishing that a flow of milk has started, but also for establishing that a flow of milk has stopped. According to this invention, such a cessation of the flow of milk is signalled to the computer, which ensures that the relevant teat cup is or will be disconnected after the lapse of a certain period of time, for example, two to sixty seconds, following receipt of this information.

The function of the flow-sensitive sensor can be assumed by a milk meter; especially when the milk meter is capable of measuring the quantity of milk produced in small increments. It is then possible to calculate the milk yield on the basis of such increments and the difference between the starting and the stopping times of the flow of milk. It may also be desirable to have four milk meters to determine the milk yields from each of the individual teats.

The processing of the signals originating from the sensors by a computer permits, at times randomly selectable by the farmer, that outputs can be displayed on the computer monitor or printed on a printer. The data to be displayed or printed may identify, for example, the animals whose dead times and/or the electrical conductivity of their milk flows have exceeded their respective predetermined values and by how much.

For example, the computer monitor or the printer could depict the following illustrative data:

A. A cow identified by number 25 gave evidence of an electrical conductivity which was 16% in excess of the predetermined value, B. A cow identified by number 100 gave evidence of an electrical conductivity which was 20% in excess of the predetermined value, C. A cow identified by number 150 gave evidence of an electrical conductivity which was 22% in excess of the predetermined value, etc.

Similarly, it may be shown that a dead time for a cow identified by number 15 has been established which was 13% in excess of a previously determined value, that a dead time for a cow identified by number 38 has been established which was 8% in excess of a previously determined value, etc.

On the basis of the information on the electrical conductivity of a flow of milk, as provided by the computer, the farmer can decide on whether or not the milk produced by a particular animal has to be diverted, for example, into a waste tank. If the milk is determined to be unsatisfactory, it is shunted through a computer-controlled three-way valve in a relevant milk line into a waste tank instead of flowing into a milk tank. When it is possible to establish that any quarter of an animal's udder suffers from mastitis, this permits the dairy farmer to discard only the milk from the quarter affected. This information may also be displayed on the computer monitor or on the printer. In addition to the aforementioned displayed or printed data on electrical conductivity and dead time, it can be indicated for example, that milk from a cow identified by number 2 is being discarded, that milk from a cow identified by number 36 is being discarded, etc.

The invention will now be further explained with reference to the embodiment represented in the accompanying drawings.

DESCRIPTION OF THE PREFERRED EMBODIMENT

Figure 1:
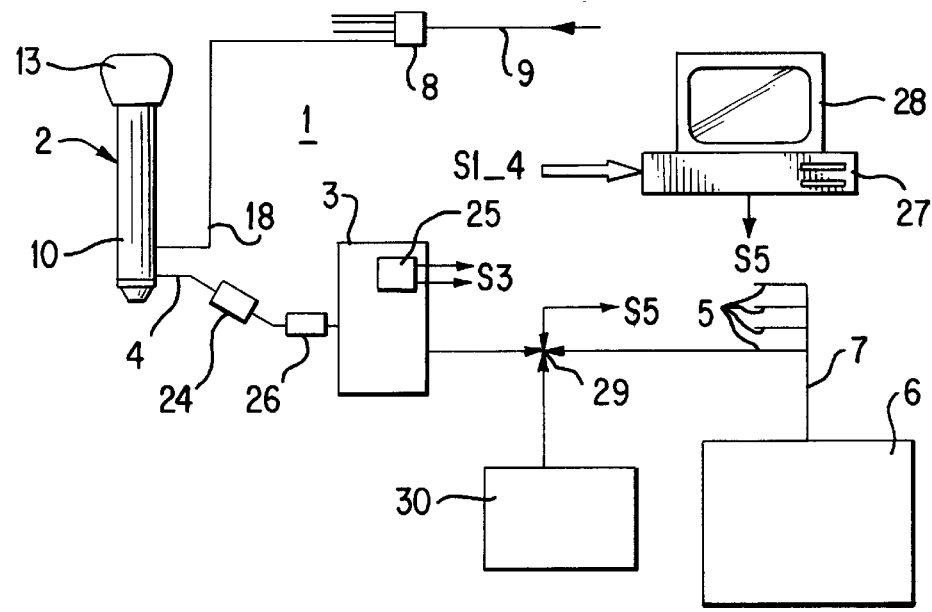
FIG. 1 is a schematic diagram of a milking plant according to the present invention.

In FIG. 1, a milking plant 1 including an apparatus for milking an animal automatically is depicted, with the representation of this milking plant being limited to only one teat cup 2 and one milk meter 3, for the sake of simplicity. The milk obtained from each udder quarter by means of a teat cup 2 can be fed through a separate milk line 4 to a milk measuring apparatus comprising four milk meters 3. Separate discharge lines 5 from milk meters 3 are connected to a common output line 7 leading to a milk tank 6. A more elaborate basic set-up of the milking plant is depicted and described in European Patent Application EP-A-0 385 539 dated Sep. 8, 1990, of van der Lely. The milking plant further comprises a pulsator system 8 connecting to the four teat cups 2. Vacuum line 9 for the pulsator system 8 is connected to a vacuum pump with an equalizer tank, as is described in European Patent Application EP-A-0385 539 dated Sep. 8, 1990, of van der Lely.

Figure 2:
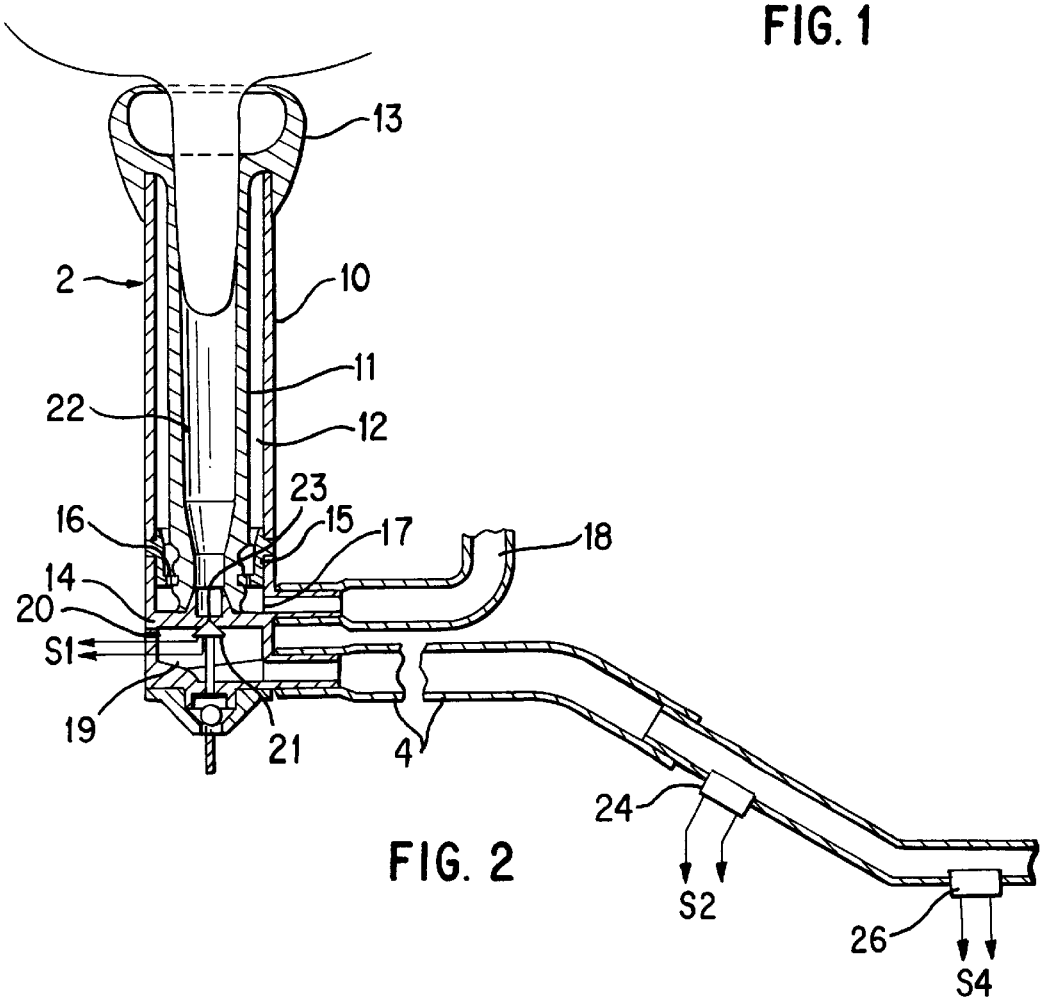
FIG. 2 is a vertical cross-section of a teat cup in accordance with the invention.

In FIG. 2, a vertical section of a teat cup 2 is shown; as is conventional, the teat cup is constructed of a rigid (for example, a metal) sleeve 10; of an inner wall 11 constructed of a flexible material, such as rubber, located in this sleeve, and of a rubber cap 13 which closes off the top side of gap 12 between sleeve 10 and inner wall 11. The bottom side of the gap between sleeve 10 and inner wall 11 is closed by a sealing ring 14, while between sleeve 10 and inner wall 11, above said ring 14, there is provided a ring 15 having an opening 16. In between sealing ring 14 and ring 15 is a space to which a pulsating vacuum is applied by pulsator system 8 through a line 18 and an opening 17, giving rise to a pulsating vacuum in the space between sleeve 10 and inner wall 11. The pulsating vacuum causes alternately the inner wall to enclose the teat tightly and then move outwards, resulting in the rhythmic motion about the teat as required for milking, provided that the teat cup is correctly connected to the teat. To provide a buffer for the milk to be collected and to minimize fluctuations in the vacuum under the teat, there is provided a buffer space 19 in the bottom part of the teat cup, where a relatively narrow air intake aperture 20 is provided to facilitate transport of the milk. Line 4 which serves to convey the milk to milk meter 3 is connected to buffer space 19. Furthermore, in buffer space 19 there is provided a stationary member 21 which partially projects into the opening between inner space 22 and buffer space 19 to ensure that the milk gradually flows into buffer space 19 and any separation of the milk is prevented. On the top side of member 21 a temperature-sensitive sensor 23 is provided to make temperature measurements. The milk temperature, which is thus determined for milk within teat cup 2, is a good indication of the body temperature of the animal being milked; especially the body temperatures of ill animals. Those animals affected by mastitis will typically have higher than normal body temperatures. A flow-sensitive sensor 24 used to detect the starting and stopping of the milk flow is included in a downstream portion of milk line 4. The operation of this flow sensitive sensor is based on the circumstance that a flow of milk causes an electrical connection between two electrodes. The inclined position of sensor 24 prevents milk, when it ceases to flow, from remaining between the electrodes, or to put it differently, it prevents little pool of milk from remaining between the electrodes; for this would result in a false indication of an uninterrupted flow of milk from teat cup. The milk line 4 also includes a vacuum-sensitive sensor 26 to determine whether a sufficient vacuum prevails in milk line 4 and teat cup 2. In milk meter 3 there is provided a sensor 25 to determine the electrical conductivity of the milk which is a mastitis sensor. This mastitis sensor comprises a reservoir provided with electrodes to measure the electrical conductivity of milk in the reservoir. With each new flow of milk, the milk in the reservoir is replaced. If the milk is abnormal due to mastitis, the electrical conductivity of the milk is higher than normal. With every new flow of milk a slight increase in the electrical conductivity is observed in the beginning. It is thus possible to determine when a flow of milk starts, too, by means of this mastitis sensor in the place of, or in addition to, the flow-sensitive sensor.

The output signals S1, S2, S3 and S4 of the respective sensors 23, 24, 25 and 26 are transmitted to a computer 27, where the information from these sensors is processed and presented on the display screen of a monitor 28. Discharge line 5 from milk meter 3 is provided with a three-way valve 29 for the purpose of diverting the flow of milk from a quarter of the animal's udder that is affected by mastitis into a waste tank 30. When the farmer decides to send milk to the waste tank 30 as the result of information processed by the computer he issues an appropriate command to the computer to do so. Three-way valve 29 then receives a signal S5 produced by the computer to redirect the flow of milk to waste tank 30 rather than to milk tank 6.

Although we have disclosed a preferred embodiment of our invention, it is to be understood that it is capable of other adaptations and modifications within the scope of the following claims.

We claim:

1. A method of determining whether an animal in a herd of animals that are automatically milked is ill or estrus, comprising: obtaining, processing and presenting by computer information relating to a dead time associated with an initial milking time during which no milk flows from the animal and at least one of the following parameters selected from a group of parameters consisting of:
   (a) said animal's milk rate of flow,
   (b) said animal's milk yield,
   (c) the number of times in a certain period of that said animal enters a milking compartment, and
   (d) the food quantity consumed by said animal in the milking compartment,
which parameters for an ill or estrus animal are different from those for a healthy or non-estrus animal.

2. A method as claimed in claim 1, comprising the additional step of determining the temperature of each of the flows of milk from the respective teats of said animal as it is being milked automatically.

3. A method as claimed in claim 2, wherein the temperature of a said flow of milk is determined by means of a temperature-sensitive sensor provided in the flow of milk.

4. A method as claimed in claim 1, wherein data from a flow-sensitive sensor indicates to said computer when said flow of milk from a teat stops and a relevant teat cup is disconnected after said computer receives this indication.

5. A method as claimed in claim 1, wherein an indication of mastitis in an animal is transmitted to said computer by means of a sensor for determining electrical conductivity of said flow of milk and also, optionally, by means of a temperature-sensitive sensor.

6. A method as claimed in claim 5, wherein the electrical conductivity of the flow of milk from each of the teats of each animal is determined.

7. A method as claimed in claim 5, wherein the extent to which the electrical conductivity of a flow of milk exceeds a previously determined value thereof for a relevant animal is ascertained in the computer.

8. A method as claimed in claim 7, wherein for each of the flows of milk from the respective teats, the extent to which the electrical conductivity exceeds the previously determined value is ascertained by said computer.

9. A method as claimed in claim 8 wherein said previously determined value is repeatedly determined anew by the progressive average of the relevant values obtained in the immediately preceding period of time.

10. A method as claimed in claim 9, wherein at selectable times, a display of the computer optionally indicates each animal whose dead time or the electrical conductivity of a flow of milk therefrom has exceeded the respective predetermined values and the extent thereof.

11. A method as claimed in claim 7 wherein said previously determined value is repeatedly determined anew by the progressive average of the relevant values obtained in the immediately preceding period of time.

12. A method as claimed in claim 11, wherein at selectable times, a display of the computer optionally indicates each animal whose dead time or the electrical conductivity of a flow of milk therefrom has exceeded the respective predetermined values and the extent thereof.

13. A method for milking animals, such as cows, which comprises continuously evaluating, comparing and recording physiological and chronological parameters of an animal with a computer during a milking operation to determine the physiological condition of the animal which is being milked; said parameters comprising milk flow rate, milk yield, frequency that the animal being evaluated has entered a milking compartment over a predetermined period of time that includes the ongoing milking operation and at least several of the animal's most recent milkings, and the quantity of food consumed by the animal while in said milking compartment.

14. A method for milking animals as claimed in claim 13, comprising determining the temperature of the milk flowing from at least one of the animal's teats by a temperature-sensitive sensor.

15. A method for automatically milking animals as claimed in claim 13, comprising evaluating via a computer data received from a flow-sensitive sensor located in at least one teat cup wherein a teat of the animal being milked is received and determining therefrom and recording when the milk flow from said teat stops.

16. A method for automatically milking animals as claimed in claim 15, comprising providing to said computer data from a temperature-sensitive sensor located in a line receiving milk flow from the teat of an animal being milked to detect mastitis in said animal.

17. A method for automatically milking animals as claimed in claim 13, comprising providing to said computer data from a conductivity sensor for detecting mastitis in an animal being milked.

18. A method for automatically milking animals as claimed in claim 17, comprising providing data to said computer from said conductivity sensor to determine the conductivity for each flow of milk from each of the teats of an animal being milked.

19. A method for automatically milking animals as claimed in claim 18, comprising determining by said computer the extent to which said conductivity exceeds a predetermined value for a particular animal which is being milked.

20. A method for automatically milking animals as claimed in claim 18, comprising determining by said computer and recording therein the extent to which said conductivity exceeds a predetermined value for each line which receives a flow of milk from each of the animal's teats.

21. A method for automatically milking animals and detecting which animals are in estrus or ill, comprising providing a milking compartment to receive said animals to be automatically milked, and obtaining, processing and presenting via a computer at least two of the following parameters selected from a group of parameters consisting of: (a) the rate of milk flow from each animal milked in said compartment, (b) the yield of milk for each animal milked in said compartment, (c) the number of times during a selected period of time each animal enters said milking compartment, (d) the quantity of food consumed by each animal in said compartment, (e) the temperature of the milk flowing from each teat for each animal being milked in said compartment, and (f) the electrical conductivity of the milk flow from each animal in said compartment, said parameters being given a value by said computer which is at least in part a function of relevant values obtained for each animal for said parameters in an immediately preceding selected period of time.

22. A method in accordance with claim 21, wherein said computer obtains, processes and presents for each said animal for said parameters progressive averages of the relevant values determined in preceding selected periods of time.

23. A method for miliking animals, such as cows, which comprises continuously evaluating, comparing and recording physiological and chronological parameters of an animal with a computer during a milking operation to determine the physiological condition of the animal which is being milked; said parameters comprising at least two of the following parameters selected from a group of parameters consisting of: milk flow rate, yield, frequency that the animal being evaluated has entered a milking compartment over a predetermined period of time that includes the ongoing milking operation and at least several of the animal's most recent milkings, and the quantity of food consumed by the animal while in said milking compartment.

24. A method for milking animals as claimed in claim 23, comprising determining the temperature of the milk flowing from at least one of the animal's teats by a temperature-sensitive sensor.

25. A method for automatically milking animals as claimed in claim 23, comprising evaluating via said computer data received from a flow-sensitive sensor located in at least one teat cup wherein a teat of the animal being milked is received and determining therefrom and recording when the milk flow from said teat stops.

26. A method for automatically milking animals as claimed in claim 25, comprising providing to said computer data from a temperature-sensitive sensor located in a line receiving milk flow from the teat of an animal being milked.

27. A method for automatically milking animals as claimed in claim 23, comprising providing to said computer data from a conductivity sensor for detecting mastitis in an animal being milked.

28. A method for automatically milking animals as claimed in claim 27, comprising providing data to said computer from said conductivity sensor to determine the conductivity for each flow of milk from each of the teats of an animal being milked.

29. A method for automatically milking animals as claimed in claim 28, comprising determining by said computer the extent to which said conductivity exceeds a predetermined value for a particular animal which is being milked.

30. A method for automatically milking animals as claimed in claim 28, comprising determining by said computer and recording therein the extent to which said conductivity exceeds a predetermined value for each line which receives a flow of milk from each of the animal's teats.

31. A method for milking animals, such as cows, which comprises continuously evaluating comparing and recording physiological and chronological parameters of an animal with a computer during said milking to determine the physiological condition of the animal which is being milked; said parameters comprising at least three of the following parameters selected from a group of parameters consisting of: milk flow rate, milk yield, frequency that animal being evaluated enters a milking compartment and the quantity of food consumed by the animal while in said milking compartment.

32. A method for milking animals as claimed in claim 31, comprising determining the temperature of the milk flowing from at least one of the animal's teats by a temperature-sensitive sensor.

33. A method for automatically milking animals as claimed in claim 31, comprising evaluating via said computer data received from a flow-sensitive sensor located in at least one teat cup wherein a teat of the animal being milked is received and determining therefrom and recording when the milk flow from said teat stops.

34. A method for automatically milking animals as claimed in claim 33, comprising providing to said computer data from a temperature-sensitive sensor located in a line receiving milk flow from the teat of an animal being milked.

35. A method for automatically milking animals as claimed in claim 31, comprising providing to said computer data from a conductivity sensor for detecting mastitis in an animal being milked.

36. A method for automatically milking animals as claimed in claim 35, comprising providing data to said computer from said conductivity sensor to determine the conductivity for each flow of milk from each of the teats of an animal being milked.

37. A method for automatically milking animals as claimed in claim 36, comprising determining by said computer the extent to which said conductivity exceeds a predetermined value for a particular animal which is being milked.

38. A method for automatically milking animals as claimed in claim 36, comprising determining by said computer and recording therein the extent to which said conductivity exceeds a predetermined value for each line which receives a flow of milk from each of the animal's teats.

* * * * *